United States Patent [19]

Rosenbaum et al.

[11] 3,816,379

[45] June 11, 1974

[54] MONOMER AND SOLVENT RECOVERY IN POLYMERIZATION PROCESSES

[75] Inventors: Harry M. Rosenbaum, Morris Plains; Bruce R. Tegge, Madison, both of N.J.; Jacques Faure, Gruchet le Valasse, France; James H. Love, Rockaway, N.J.

[73] Assignee: Esso Research and Engineering Company, Linden, N.J.

[22] Filed: July 26, 1971

[21] Appl. No.: 165,986

[52] U.S. Cl............................ 260/80.78, 260/88.25
[51] Int. Cl............................ C08f 1/88, C08f 1/96
[58] Field of Search............ 260/94.9 F, 80.78, 88.2

[56] References Cited
UNITED STATES PATENTS

| 3,245,967 | 4/1966 | Moon | 260/88.2 |
|---|---|---|---|
| 3,257,374 | 6/1966 | Bell | 260/94.9 |
| 3,259,555 | 7/1966 | Lankton | 203/63 |
| 3,378,467 | 4/1968 | Colton | 203/42 |
| 3,418,305 | 12/1968 | Payne | 260/94.9 |
| 3,600,463 | 8/1971 | Hagemeyer | 260/878 B |

Primary Examiner—Joseph L. Schofer
Assistant Examiner—Edward J. Smith

[57] ABSTRACT

Improvements in the process for preparing copolymers of ethylene, higher alpha-olefins and, optionally as termonomer, a nonconjugated diene include subjecting the reactor effluent containing polymer cement, unreacted monomers, catalyst composition, and diluent-solvent to a first stripping operation, wherein recycled vaporous diluent-solvent is used as stripping medium, whereby substantially all unreacted light monomers and some diluent-solvent are taken as overhead. The first stripper bottoms are deashed and subjected to a second stripping operation employing steam as stripping medium. The overhead of this second operation, containing substantially all remaining diluent-solvent and some steam, is condensed; most water is withdrawn therefrom and the remaining water-saturated diluent-solvent is fractionated separating as overhead, any remaining water and any light impurities, and, as bottoms dry diluent-solvent and any heavy impurities. These bottoms are again fractionated separating as overhead, pure hot vaporous diluent-solvent which is recycled to the first stripping operation as stripping medium, and, as bottoms heavy impurities and any heavy termonomer. The overhead of the first stripping operation may be partially condensed, separating as overhead light monomers, any light impurities, and some diluent-solvent. The condensate containing a major portion of diluent-solvent and minor amounts of light monomer may be directly recycled to the reactor. The noncondensed portion may be fractionated, thereby separating substantially all unreacted light monomer as overhead which may be recycled directly to the reactor. The bottoms, containing diluent-solvent and light impurities, may be combined with the overhead from the second stripping operation. This process results in improved and simplified monomer and diluent-solvent recycle and significant investment and operating cost savings due to improved heat integration and reduction of required processing equipment.

8 Claims, 1 Drawing Figure

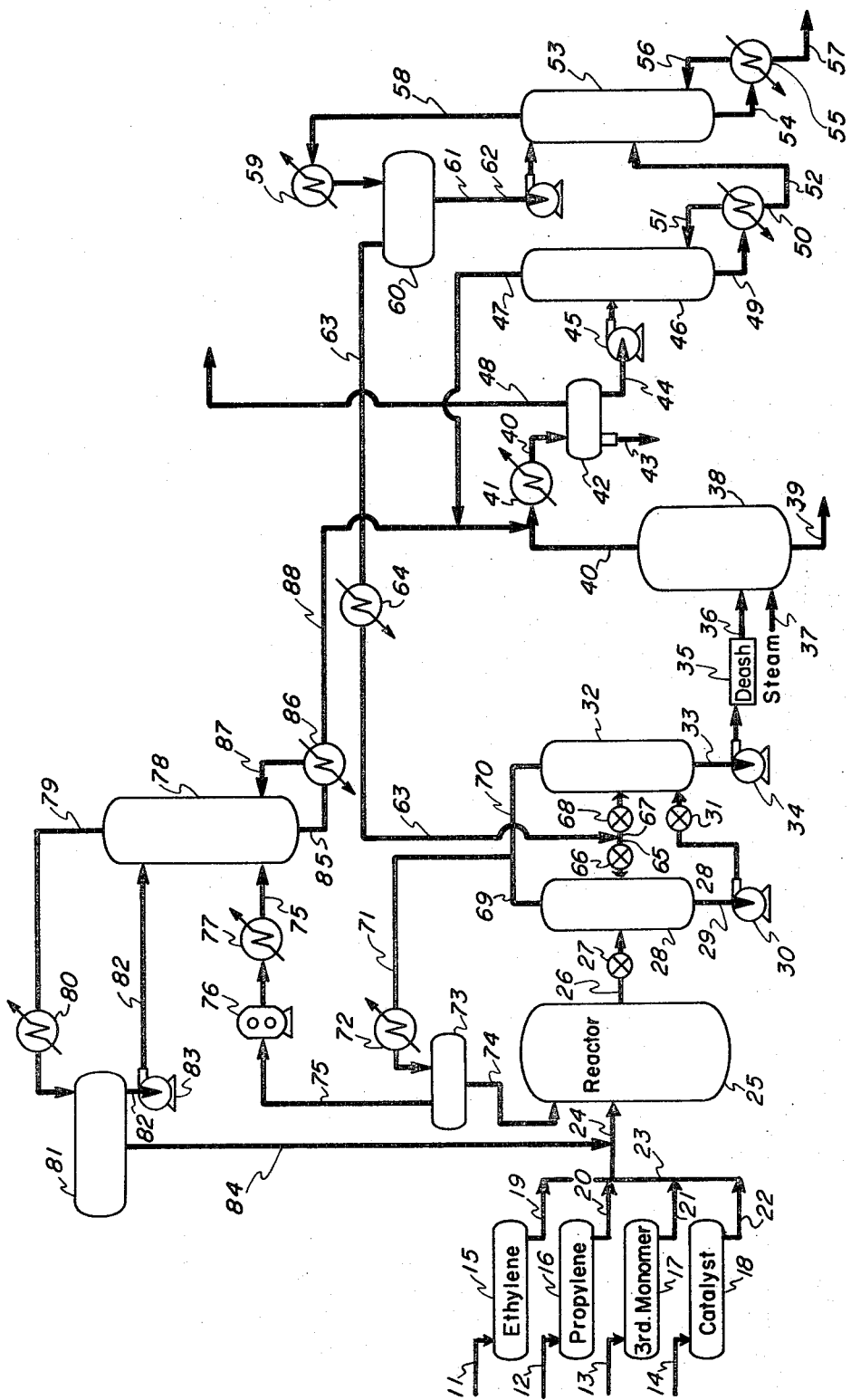

MONOMER AND SOLVENT RECOVERY IN POLYMERIZATION PROCESSES

BACKGROUND OF THE INVENTION

As is well-known to those skilled in the art, ethylene may be copolymerized with higher alpha-olefins, preferably propylene, to prepare copolymers. Typically, the higher alpha-olefins have the general formula: $R-CH=CH_2$, where R is a $C_1$ to $C_8$ alkyl radical, and preferably a $C_1$ to $C_4$ alkyl radical. The higher alpha-olefin may be linear or branched and, while a single higher alpha-olefin is preferable, mixtures of higher alpha-olefins may be employed. Suitable examples of higher alpha-olefins having the above-mentioned general formula include: propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4'-dimethyl-1-pentene, 4-methyl-1-heptene, 5-methyl-1-heptene, 6-methyl-1-heptene, 4,4'-dimethyl-1-hexene, 5,6,6-trimethyl-1-heptene, 5,5-dimethyl-1-octene, and 5-methyl-1-nonene; particularly preferred herein is propylene.

Preferably, the copolymer may be a terpolymer wherein the third monomer may be a nonconjugated diene, preferably a nonconjugated diene having 6 to 15 carbon atoms. Typical examples of useful nonconjugated dienes include 5-alkylidene-2-norbornenes such as 5-methylene-2-norbornene, 5-ethylidene-2-norbornene, etc.; 5-alkenyl-2-norbornenes such as 5-vinyl-2-norbornene, 5-(3'-butene)-2-norbornene, etc.; 2-alkyl-norbornadienes such as 2-methyl-norbornadiene, 2-ethyl-norbornadiene, etc.; acyclic nonconjugated dienes such as 2,4-dimethyl-2,7-octadiene, 11-ethyl-1,11-tridecadiene, 1,4-hexadiene, etc.; alicyclic nonconjugated dienes such as dicyclopentadiene, 3-methallyl cyclopentene, 1,5-cyclooctadiene, etc.; hydroindenes such as 4,7,8,9-tetrahydroindene, etc.

Typically the monomeric reactants may be present in the following amounts, measured per 100 parts of solvent: about 0.1 to about 10.0, preferably 1.0–6.0 (e.g. 2.75), parts of ethylene; about 0.1 to about 20.0, preferably 1.0–15.0 (e.g. 12.5), parts of higher alpha-olefin (e.g. propylene); from 0.0 to about 2.0, preferably 0.0–1.0 (e.g. 0.22), parts diene (e.g. 5-ethylidene-2-norbornene). Here, as elsewhere in this specification, all parts given are parts by weight unless otherwise specifically stated.

The components of the catalyst composition, e.g. the Ziegler-type catalyst, may include, as catalyst, a compound of a transition metal (preferably a halide such as titanium tetrachloride or vanadium tetrachloride) together with, as cocatalyst, an organometal compound (e.g. an organoaluminum compound such as diethylaluminum chloride). Generally the mole ratio of the cocatalyst to the catalyst is in the range of 1:1 to 16:1, preferably 1.5:1 to 7:1. The total amount of catalyst composition employed in the polymerization reaction may vary depending upon the particular components of the catalyst system, but is generally in the range of about 0.01 to about 0.1 parts, preferably 0.05 parts per 100 parts of diluent-solvent.

This diluent-solvent employed in this reaction is a nonreactive reaction medium typically an aromatic hydrocarbon such as toluene, a saturated aliphatic hydrocarbon such as heptane, pentane, and hexane, or a chlorohydrocarbon such as tetrachloroethylene. For purposes of the instant invention the diluent-solvent preferably employed is hexane. The term "diluent-solvent" is meant to indicate that the fluid employed is a solvent for the reactants, but essentially a diluent for the copolymer.

Reaction may take place at a temperature in the range of about 10° to about 75°C., preferably about 25° to about 40°C. (typically about 30°C.). Pressure in the reactor should at all times be above the vapor pressure of the reacting medium at the particular reactor temperature. Pressures employed are normally in the range of about 0 to about 70 atm., preferably about 4 to about 10 atm. (typically 6 atm.). All steps in the reaction should preferably be carried out in the absence of oxygen, moisture, carbon dioxide or other harmful materials. Therefore, all reactants, diluent-solvent and catalysts should be pure and dry and blanketed with inert gas such as nitrogen or methane.

After reaction, the reactor effluent, as withdrawn, normally contains unreacted ethylene and higher alpha-olefin (unreacted termonomer when producing terpolymer), some unreacted but mainly spent catalyst, and ethylene-higher alpha-olefin copolymer (typically ethylene-propylene-diene terpolymer, when termonomer is employed), this being dissolved in the inert diluent-solvent to form a solution containing about 3 to about 15, typically 5 parts of copolymer per 100 parts of diluent-solvent, i.e. copolymer cement.

In the prior art, this reactor effluent normally undergoes catalyst deactivation by addition of a suitable quenching agent such as an alcohol, followed by deashing and steam stripping. During the latter operation, the inert organic diluent and the unreacted monomers are separated from the product polymer by steam distillation. The overhead from this operation normally includes inert organic diluent and unreacted monomer, along with, as contaminants, water, alcohol (or a similar quench agent), carbon dioxide which enters the system with the water and steam, and oxygen. Since the polymerization reaction must be carried out in the absence of these contaminants, it is essential that they be removed if the reactants and diluent are to be recycled. It will be apparent to those skilled in the art that difficult and expensive distillation and/or adsorption steps must be carried out to produce recycle monomer and inert diluent-solvent which are free of these contaminants; the problem is particularly significant in the case of propylene as the requisite separations can be carried out only with difficulty and at great expense.

THE PRESENT INVENTION

Applicants have now discovered that by use of the novel process of the instant invention it is possible to obtain improved and simplified monomer and diluent-solvent recycle while at the same time obtaining significant investment and operating cost savings due to improved heat integration techniques and reduction of required processing equipment.

This novel process involves a series of treating steps, the first of which involves stripping the liquid reactor effluent withdrawn from the reactor in a first stripping operation at a pressure below that prevailing in the reactor, preferably at a pressure at least about 2 atm. below reactor pressure (e.g. typically below about 4 atm. and more preferably in the range of about 1 atm. to about 1.5 atm.) and at sufficient temperature to recover as first stripper overhead substantially all unreacted light monomer (e.g. unreacted ethylene and propylene), light impurities (e.g. propane, butenes, and pentenes) and a substantial portion of diluent-solvent and, as bottoms, copolymer cement (ethylene-propylene copolymer dissolved in diluent-solvent). The temperatures for this first stripping operation are normally in the range of about 50° to about 100°C. (typically 75°C.). This first stripping operation employs, as the stripping medium, pure recycled hot vaporous diluent-solvent as explained more fully below. This is in contrast to the standard stripping operations of the prior art which employ steam. By employing vaporous diluent-solvent as the stripping medium in this first stripping operation it is possible to avoid contaminating unreacted light monomers with water and carbon dioxide, thus eliminating the necessity of later employing driers and additional fractionating columns to purify light monomers.

While this first stripping operation has been discussed above as though it were in one stage, it is important to note that a two-stage stripping operation may also be employed and, in fact, is preferred. Of course, vaporous diluent-solvent could be used as stripping medium in both stages. Pressures employed in each stage are typically 1 atm. to 1.5 atm. The advantage of the two-stage operation resides in the fact that the first stage may be run at a significantly lower temperature, e.g. a temperature in the range of about 20° to about 65°C., which temperature range will result in substantially all unreacted ethylene, only a minor amount of unreacted higher alpha-olefin, and only a minor amount of diluent-solvent being withdrawn as overhead. The advantage of withdrawing substantially all unreacted ethylene at this lower temperature resides in the fact that, at lower temperatures, unwanted additional polymerization may be effectively avoided without the necessity of employing a nonvolatile quench agent prior to stripping in order to deactivate the catalyst. It follows, then, that if a one-stage stripping operation is employed at this point, it is preferable to introduce into the reactor effluent, prior to stripping, a quench agent or catalyst deactivator such as triethylene glycol or similar materials.

A further advantage of two-stage operation is that the amount of diluent-solvent withdrawn as overhead together with substantially all unreacted ethylene and higher alpha-olefin can be regulated by varying the degree of stripping (e.g. temperature and pressure) in each stage.

The bottoms of the first stripping operation (whether employing one or two stages) are then dashed and subjected to a second stripping operation using steam as a stripping medium, thereby separating, as second stripper overhead, heavy impurities (e.g. low molecular weight oligomers formed as reaction by-products, finely divided copolymer, etc.), steam, substantially all diluent-solvent, and unreacted diene if employed. The second stripper bottoms will contain a copolymer slurry in water. The temperature employed in the second stripping operation should be higher than the boiling point of the diluent-solvent at prevailing pressures in order to remove all diluent-solvent as overhead. This temperature is normally in the range of about 65° to about 125°C., preferably about 100° to about 115°C., typically about 110°C. Pressures in the second stripping operation are preferably low enough to avoid the necessity for excessively high temperatures and are normally in the range of about 1 to about 3 atm., typically about 2 atm.

The next step in this novel process involves recovering and condensing the second striper overhead and withdrawing therefrom the condensed water, thereby leaving a condensate containing water saturated diluent-solvent, heavy impurities, and unreacted diene if employed. Condensation pressures are essentially the same as those in the second stripping operation. Temperatures may range from about 35° to about 100°C., preferably 55° to 70°C., typically 65°C. and will, in any event, be less than that in the second stripping operation.

The condensate is then fed to a fractionation column wherein all remaining water is separated as overhead with dry diluent-solvent, heavy impurities, and any unreacted diene remaining as bottoms. This fractionation is normally performed at a temperature in the range of about 80° to about 175°C., preferably about 95° to about 140°C., typically about 105°C.; and at a pressure in the range of about 1.5 to about 8 atm., preferably about 2.7 atm. to about 6 atm., typically 2.7 atm.

The next step involves subjecting the bottoms of this first fractionating column to a second fractionation, thereby forming as overhead pure, vaporous diluent-solvent and, as bottoms, heavy impurities and unreacted diene, if used. This second fractionating column is normally run at a bottoms temperature in the range of about 90° to about 175°C., preferably about 120°C. to about 150°C., typically 140°C., an overhead temperature in the range of about 80°C. to about 175°C., preferably 90°C. to 140°C., typically 100°C., and a pressure in the range of about 1.5 to about 8 atm., preferably about 1.5 to about 5 atm., typically 2.5 atm.

Finally, the hot vaporous diluent-solvent obtained as overhead in the second fractionating column is recycled to the first stripping operation for use as a stripping medium. This recycled vaporous diluent-solvent may, if desired, be subjected to further heating or cooling prior to its use as stripping medium in the first stripping operation.

The process may be further improved by performing the following additional steps. The stripper overhead from the first stripping operation, as explained above, is subjected to a partial condensation, thereby forming a noncondensed portion containing a major portion of unreacted light monomer (e.g. ethylene and propylene), light impurities, and a minor portion of diluent-solvent. This condensation is performed at a temperature in the range of about 10°C. to about 65°C., preferably 20°–40°C., typically 35°C., and at a pressure in the range of about 1 to about 1.5 atm., preferably 1.1 atm. A condensate is obtained which contains a major portion of the diluent-solvent and a minor portion of unreacted light monomer, and which may be recycled directly to the reactor.

The first stripper overhead typically has a composition (as measured in parts per 100 parts of solvent) as set forth in Table I below:

TABLE I

| Component | Broad Range | Preferred Range | Typical |
|---|---|---|---|
| Ethylene | 0.1–1.0 | 0.2–0.6 | 0.3 |
| Higher Alpha-Olefin, e.g. Propylene | 2–20 | 5–15 | 10 |

| | | | |
|---|---|---|---|
| Light Impurities (Primarily Propane with minor amounts of Butenes and Pentenes) | 0.2–6 | 1–3 | 2 |
| Diluent-Solvent | 20–150 | 80–120 | 110 |

After this partial condensation step, the composition of the noncondensed portion will typically be as set forth in Table II below:

TABLE II

| Component | Broad Range | Preferred Range | Typical |
|---|---|---|---|
| Ethylene | 0.1–1.0 | 0.2–0.6 | 0.3 |
| Higher Alpha-Olefin, e.g. Propylene | 1.5–15 | 3–12 | 8 |
| Light Impurities | 0.15–4.5 | 0.5–2.5 | 1.6 |
| Diluent-Solvent | 1–50 | 5–20 | 10 |

While the condensate from the partial condensation (i.e. the diluent-solvent) may be directly recycled to the reactor, the noncondensed portion must be further treated to separate unreacted monomers from remaining impurities and diluent-solvent. This is accomplished by fractionating said noncondensed portion, thereby separating as overhead substantially all unreacted monomers and, as bottoms, light impurities and diluent-solvent. This fractionation step normally takes place at an overhead temperature in the range of about $-15°$ to about $15°C.$, preferably $-5°$ to $10°C.$, typically $7°C.$, a bottoms temperature in the range of about $75°$ to about $150°C.$, preferably $90°$ to $130°C.$, typically $120°C.$, and at a pressure in the range of about 2.5 to about 11 atm., preferably 4.5 to 8 atm., typically 6.5 atm.

The overhead from this fractionation step, which contains pure unreacted light monomer, may be recycled directly to the reactor. The bottoms, containing light impurities and diluent-solvent, may be combined with the overhead from the previously discussed second stripper operation prior to fractionating the second stripper overhead. By combining these bottoms with the second stripper overhead it is possible to use the same fractionation tower to separate both light impurities and remaining water in the saturated diluent-solvent. It also completes an essentially closed system for the diluent-solvent in which diluent-solvent may be recycled to the reactor as a liquid and may also be used in vaporous form as stripping medium for the first stripping operation.

Advantages achieved by the use of this novel process over processes of the prior art include but are not limited to:

The utilization of significant heat integration techniques to reduce the overall process utility requirements.

The utilization of lower cost diluent-solvent fractionation facilities to provide a purified overhead product in vapor form.

An optimized light monomer recovery technique which results in significant operating cost and investment savings.

An integrated monomer and solvent recycle and purification system which provides considerable process flexibility and economic savings due to reduced investment and lower utilities requirements.

An optimized process for providing extremely high purity monomer and diluent-solvent recycle streams resulting in improved reactor efficiencies because of the absence of impurities.

FIG. 1 sets forth the preferred embodiment for the practice of the novel process of this invention. In FIG. 1, higher alpha-olefin, e.g. propylene, feed may be admitted through line 12 to propylene storage drum 16 from which it may pass through lines 20, 23, and 24 to reaction vessel 25. In like manner, ethylene feed may be admitted through line 11 to ethylene storage vessel 15 from which it may pass through lines 19, 23 and 24 to reaction vessel 25. Third monomer may be admitted through line 13 to third monomer storage vessel 17 from which it may pass through lines 21, 23 and 24 to reaction vessel 25. Catalyst may be admitted through line 14 to catalyst storage vessel 18 from which it may pass through lines 22, 23, and 24 to reaction vessel 25. Although these feeds to reaction vessel 25 are schematically shown as separate, two or more may be combined into two or more charge streams to the vessel.

Reactor 25 may be a vessel adapted to be operated at pressure and temperature of reaction. It will typically contain an agitator and heating and/or cooling coils. Reactor effluent may exit the reaction vessel, or reactor, through line 26, be passed through throttle valve 27 directly into the first stage 28 of the first stripping operation.

Stripper bottoms from this first stage (i.e. copolymer cement, a substantial amount of unreacted propylene, and a major amount of diluent-solvent) may be withdrawn by line 29 and pump 30 and fed through throttle valve 31 directly to the second stage 32 of the first stripper operation.

Bottoms from this second stage may be removed therefrom by line 33 and pump 34, subjected to deashing 35, then fed directly to the second stripping operation 38 by line 36. The stripping medium for this second stripper operation is steam and is introduced into the second stripper 38 by steam line 37.

Bottoms from this second stripping operation (i.e. copolymer slurried in water) may be separated therefrom by line 39.

The overhead from this second stripping operation (i.e. heavy impurities, steam, substantially all diluent-solvent and any unreacted diene) is withdrawn by line 40, condensed in condenser 41, and then sent directly to feed drum 42.

A major portion of the condensed water is withdrawn from feed drum 42 by line 43 and the remaining condensate, containing saturated diluent-solvent, is withdrawn from feed drum 42 through line 44 and pump 45 and fed directly to fractionator 46. This fractionator separates as overhead all remaining water and any remaining light impurities. The overhead is withdrawn and recycled to storage vessel 42 through lines 47, 88 and 40 and condenser 41. Condenser 41 is run at sufficient temperature and pressure as heretofore described so that condensation of light impurities (which enter through line 88 as more fully described hereinafter) is avoided. These noncondensed light impurities (e.g. propane, butenes, pentenes) are vented from feed drum 42 through line 48.

The bottoms from fractionator 46 which contain dry diluent-solvent, any unreacted diene, and any heavy impurities are withdrawn from the fractionator through line 49 and passed to heat exchanger 50. A portion of the bottoms is recycled to the fractionator through line 51 with the remainder being taken through line 52 and fed directly to a second fractionating column 53. This second fractionation is run at temperatures and pressures as heretofore described so as to separate as overhead hot, vaporous diluent-solvent through line 58 and partial condenser 59 to reflux drum 60. The condensed portion is recycled to fractionator 53 from reflux drum 60 through line 61 and pump 62. The noncondensed, pure, dry, vaporous diluent-solvent is withdrawn from the reflux drum 60 through line 63, heat exchanger 64, line 65 and control valve 66 and/or through line 63, heat exchanger 64, line 67 and control valve 68 to the first stage 28 and the second stage 32, respectively, of said first stripping operation in which said hot, vaporous diluent-solvent is used as stripping medium.

The overhead from the first stage 28 of the first stripping operation which contains substantially all unreacted ethylene, a substantial amount of unreacted propylene and a minor amount of diluent-solvent may be withdrawn therefrom by line 69. The overhead from the second stage 32 of the first stripping operation which contains substantially all remaining unreacted propylene, light impurities, and a substantial portion of diluent-solvent may be withdrawn therefrom through line 70. The overhead from lines 69 and 70 are combined in line 71 and subjected to partial condensation in condenser 72 and then fed directly to storage vessel 73. This partial condensation under conditions as heretofore described results in a condensate which contains a major portion of the diluent-solvent and a minor portion of unreacted light monomer which may be recycled directly to the reactor by withdrawing it from storage vessel 73 through line 74. The noncondensed portion, which contains a major portion of unreacted light monomers, light impurities, and a minor portion of diluent-solvent is withdrawn from storage vessel 73 through line 75, compressed and cooled in compressor 76 and condenser 77, respectively, and passed directly to fractionating column 78.

The conditions in the fractionating column 78 as previously set forth are such as to separate as overhead through line 79 pure, unreacted light monomer. This overhead is cooled in condenser 80 and passed directly to reflux drum 81. A portion is recycled to the fractionator through line 82 and pump 83 and the remainder is passed directly to the reactor through lines 84 and 24.

The bottoms from fractionator 78 containing light impurities and diluent-solvent may be withdrawn therefrom through line 85 and passed to heat exchanger 86 from which a portion is recycled to the fractionator through line 87 and the remainder is combined with the overhead from the previously discussed second stripper operation through line 88.

The following example is meant to illustrate but in no way limit the present invention.

The following total charge per hour, 30°C., may be charged to reaction vessel 25 through lines 24 and 74:

TABLE III

| Component | Parts |
| --- | --- |
| Ethylene | 2.75 |
| Propylene | 12.5 |
| Propane | 2.0 |
| 5-Ethylidene-2-Norbornene | 0.22 |
| Hexane (Diluent-Solvent) | 100 |
| Catalyst (Total) | 0.05 |
| Vanadium Tetrachloride | 0.008 |
| Diethylaluminum Chloride | 0.042 |

Reaction may be carried out at 30°C. and 6 atm. for 15 minutes to produce reactor effluent in line 26 containing the following:

TABLE IV

| Component | Parts |
| --- | --- |
| Unreacted Ethylene | 0.275 |
| Unreacted Propylene | 9.85 |
| Propane | 2.0 |
| Unreacted 5-Ethylidene-2-Norbornene | 0.07 |
| Light Impurities (Butenes and Pentenes) | 0.025 |
| Polymer | 5.1 |
| Heavy Impurities | 0.08 |
| Hexane | 100 |
| Cement (Total) | 117 |

The reactor effluent may be passed as shown in FIG. 1 through throttle valve 27 into the first stage of the first stripping operation 28 having a temperature of 35°C. and a pressure of 1.1 atm. The overhead from this first stage which passes through line 69 may contain 0.275 parts of ethylene, 8.5 parts of propylene, 1.7 parts of propane and light impurities and 35 parts of hexane.

The bottoms from this first stage which are withdrawn through line 29 and pump 30 and throttle valve 31 are passed to a second stage 32 which is run at a pressure of 1.1 atm. and a temperature of 80°C. The overhead from this second stage is withdrawn through line 70 and may contain 1.35 parts of propylene and 75 parts of hexane, along with 0.3 parts of propane and light impurities (butenes and pentenes). The bottoms of this second stage are withdrawn through line 33 and pump 34, deashed, and then subjected to a second stripping operation using steam as the stripping medium. The temperature in the second stripping operation may be 110°C. and the pressure 2 atm.

The bottoms of this second stripping operation, i.e. copolymer slurried in water, containing 3 parts of polymer per 100 parts of water, is withdrawn through line 39. Second stripper overhead may be withdrawn through line 40 and will have the following composition:

TABLE V

| Component | Parts |
| --- | --- |
| Diluent-Solvent | 100 |
| Unreacted Diene | 0.07 |
| Heavy Impurities | 0.08 |
| Water (Vapor) | 14 |

This overhead is condensed in condenser 41 at a temperature of 65°C. and a pressure of 2 atm. and then fed to feed drum 42. The condensed water is withdrawn from feed drum 42 through line 43 and the remaining condensate, i.e. water saturated diluent-solvent, heavy impurities, and unreacted diene, is passed through line 44 and pump 45 to fractionator 46. Fractionation occurs at a temperature of 105°C. and a pressure of 2.7 atm. Under these conditions, any remaining water is separated as overhead through line 47.

The bottoms, which contain dry diluent-solvent, heavy impurities and unreacted diene in the amounts given above, are withdrawn through line 49 to heat exchanger 50. A portion is recycled through line 51 and the remainder is passed through line 52 directly to the second fractionating column.

The second fractionating column is run at a bottoms temperature of 140°C. and an overhead temperature of 100°C. The pressure in the second fractionator is 2.4 atm. Under these conditions, hot vaporous diluent-solvent is separated as overhead from this second fractionating column through line 58, subjected to partial condensation in condenser 59 which is run at a temperature of 100°C., and fed to reflux drum 60. The condensed portion is recycled to the second fractionator through line 61 and pump 62.

The noncondensed portion is removed from reflux drum 60 through line 63 at a pressure of 2.4 atm. and a temperature of 100°C., and thence superheated in heat exchanger 64 to a temperature of 200°C. Superheated vapors are then passed through line 65 and control valve 66 and line 67 and control valve 68, respectively, to the first and second stages of the first stripping operation. The vaporous diluent-solvent enters the first stripping operation for use as the stripping medium at a temperature of 200°C. and a pressure of 1.5 atm.

The overhead from the first and second stages of the first stripping operation, withdrawn through lines 69 and 70, respectively, and having the compositions heretofore described, are combined in line 71 and subjected to partial condensation in condenser 72 at a temperature of 35°C. and a pressure of 1.1 atm. The composition of the noncondensed portion is as follows:

TABLE VI

| Component | Parts |
|---|---|
| Ethylene | 0.275 |
| Propylene | 8 |
| Light Impurities (Propane and minor amounts of Butenes and Pentenes) | 1.6 |
| Hexane | 10 |

The condensed portion contains 100 parts of diluent-solvent, essentially zero parts of ethylene, 1.85 parts of propylene, and 0.4 parts of propane, and is recycled directly to the reactor from storage vessel 73 through line 74.

The noncondensed portion is withdrawn from storage vessel 73 through line 75, compressed in compressor 76 at a pressure of 6.5 atm., and cooled in condenser 77 to a temperature of 40°C. It is then passed to fractionating column 78, which is run at an overhead temperature of 7°C. and a bottoms temperature of 120°C., and at a pressure of 6.5 atm.

Under such conditions, the bottoms of this fractionating column will have the following composition:

TABLE VII

| Component | Parts |
|---|---|
| Light Impurities (Propane and minor amounts of Butenes and Pentenes) | 0.3 |
| Hexane | 10 |

This bottoms is withdrawn from fractionator 78 through line 85 to heat exchanger 86, which runs at a temperature of 120°C. A portion of the bottoms is recycled to the fractionator through line 87 with the remainder passing through line 88, line 40, condenser 41 (run under conditions heretofore described so that light impurities do not condense) to feed drum 42, from whence light impurities are vented through line 48.

The overhead from fractionator 78 is withdrawn through line 79 at a temperature of 7°C. and a pressure of 6.5 atm. and is passed to condenser 80, which is run at a temperature of 7°C. and then directly to reflux drum 81. A portion of the condensate is recycled to the fractionator through line 82 and pump 83 for reflux and the remainder, having the following composition, is passed directly to the reactor through lines 84 and 24:

TABLE VIII

| Component | Parts |
|---|---|
| Ethylene | 0.275 |
| Propylene | 8 |
| Propane | 1.3 |

Although this invention has been illustrated by reference to specific embodiments, the invention is not meant to be limited thereby and it will be apparent to those skilled in the art that various changes and modifications may be made which clearly fall within the scope of this invention. The invention is limited only by the claims which follow.

What is claimed is:

1. In the process for preparing a copolymer, comprising as reactants ethylene and a $C_3$ to $C_{10}$ higher alpha-olefin including forming a mixture of ethylene and a $C_3$ to $C_{10}$ higher alpha-olefin; contacting said mixture in a reaction medium including a liquid diluent-solvent with a catalytic amount of a catalyst composition containing, as catalyst, a compound of a transition metal and, as cocatalyst an organometal compound, thereby forming a copolymer of ethylene and a $C_3$ to $C_{10}$ higher alpha-olefin; and withdrawing from said reaction medium a liquid reactor effluent containing catalyst composition, unreacted ethylene and higher alpha-olefin, and a cement of copolymer in said liquid diluent-solvent; the improvement which comprises the steps of:

A. stripping said liquid reactor effluent in a first stripping operation at a pressure below that of the reactor and at a sufficient temperature to recover as first stripper overhead substantially all unreacted light monomer, light impurities, and a substantial portion of diluent-solvent and, as bottoms, copolymer cement and a major portion of diluent-solvent using as the stripping means vaporous solvent diluent;

B. stripping said first stripper bottoms in a second stripping operation using steam as a stripping medium thereby separating as second stripper overhead, heavy impurities, steam and substantially all diluent-solvent and, as second stripper bottoms, a copolymer slurry;

C. condensing said second stripper overhead and withdrawing therefrom a major portion of condensed water thereby leaving a condensate containing saturated diluent-solvent;

D. fractionating said condensate thereby separating as overhead any remaining water and, as bottoms, dry diluent-solvent and any heavy impurities;

E. performing a fractional distillation on said bottoms of step (D) thereby forming as overhead pure, vaporous diluent-solvent and, as bottoms, heavy impurities;

F. recycling said vaporous diluent-solvent to said first stripping operation for use as stripping medium; and G. returning a portion of the purified diluent to the reactor.

2. The process of claim 1 wherein said first stripping operation is performed at a temperature in the range of about 65° to about 95°C. and at a pressure at least about 2 atm. below reactor pressure, and said second stripping operation is performed at a temperature in the range of about 65° to about 115°C. and at a pressure in the range of about 1 to about 3 atm.

3. The process of claim 1 wherein the fractionation of step (D) is performed at a temperature in the range of about 65° to about 175°C. and a pressure in the range of about 1.5 to about 8 atm. and the fractionation of step (E) is performed at a temperature of about 80° to about 175°C. and a pressure of about 1.5 to about 8 atm.

4. The process of claim 1 wherein said diluent-solvent is hexane.

5. The process of claim 1 which further comprises the steps of:

1. partially condensing said first stripper overhead thereby forming a. a noncondensed portion containing a major portion of unreacted light monomer, light impurities, and a minor portion of diluent-solvent, and b. a condensate containing a major portion of said diluent-solvent and a minor portion of unreacted light monomer;

2. recycling said condensate of diluent-solvent to said reactor;

3. fractionating said noncondensed portion thereby separating as overhead substantially all unreacted monomers and, as bottoms, light impurities and diluent-solvent;

4. recycling said overhead of step (3) containing unreacted monomers to said reactor, and 5. combining said bottoms from step (3) with the overhead from the second stripper operation of claim 1.

6. The process of claim 5 wherein the partial condensation of step (1) is performed at a temperature in the range of about 10° to about 65°C. and a pressure of about 1 to about 1.5 atm., and the fractionation of step (3) is performed at a temperature in the range of from about −15° to about 150°C. and a pressure in the range of from about 2.5 to about 11 atm.

7. The process of claim 5 wherein said reactants additionally include a nonconjugated diene and the copolymer formed is a terpolymer of ethylene, a $C_3$ to $C_{10}$ higher alpha-olefin, and a nonconjugated diene.

8. The process of claim 7 wherein said alpha-olefin is propylene.

* * * * *